(No Model.)
F. H. RICHARDS.
FRICTION CLUTCH.
No. 303,321. Patented Aug. 12, 1884.
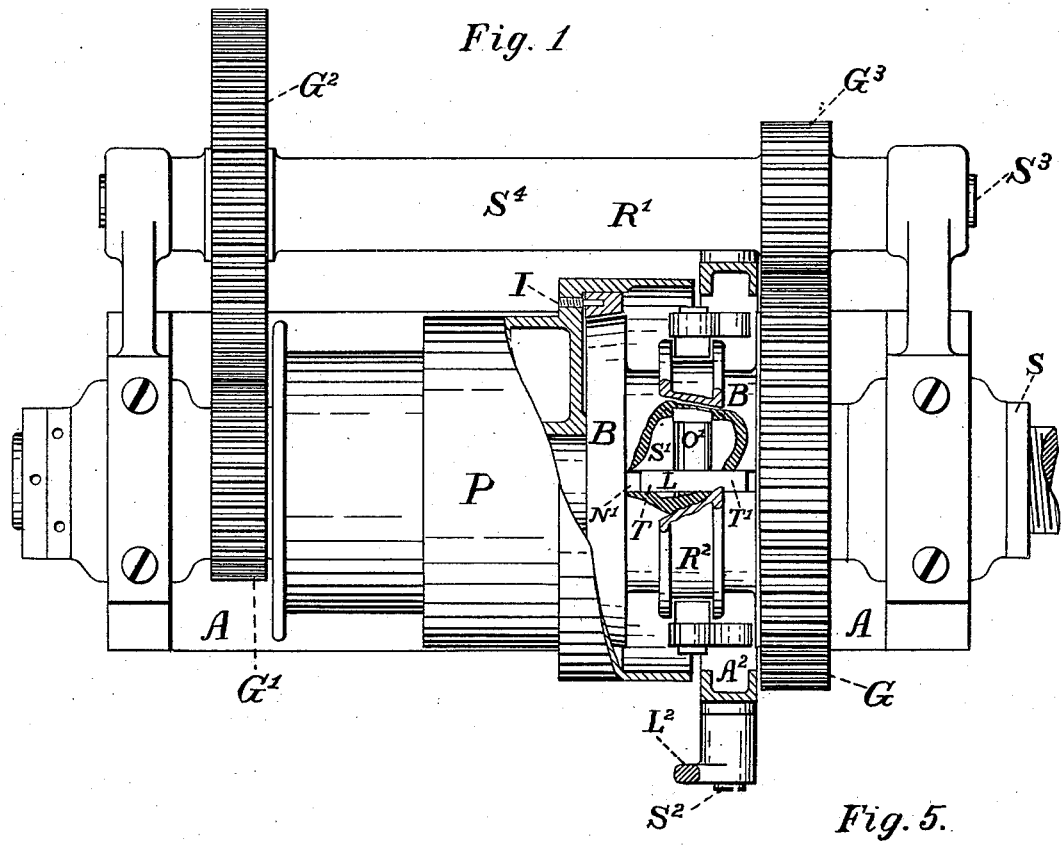
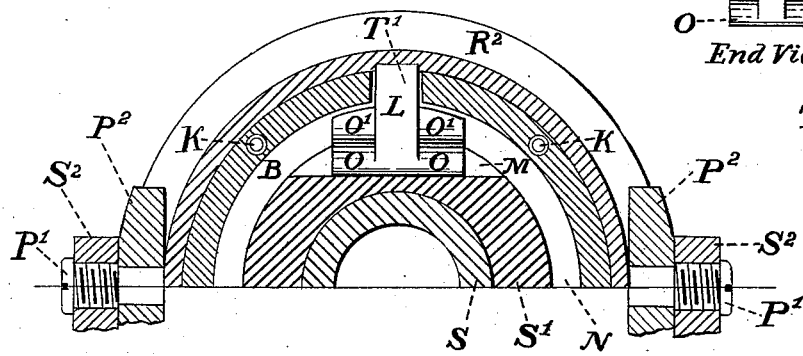
Witnesses:
C. O. Palmer
H. W. Faulkner
Inventor:
Francis H. Richards (No Model.) 2 Sheets—Sheet 2.

F. H. RICHARDS.
FRICTION CLUTCH.

No. 303,321. Patented Aug. 12, 1884.

Witnesses;
C. O. Palmer.
H. W. Faulkner.

Inventor;
Francis H. Richards.

United States Patent Office.

FRANCIS H. RICHARDS, OF SPRINGFIELD, MASSACHUSETTS, ASSIGNOR TO THE PRATT & WHITNEY COMPANY, OF HARTFORD, CONNECTICUT.

FRICTION-CLUTCH.

SPECIFICATION forming part of Letters Patent No. 303,321, dated August 12, 1884.

Application filed March 10, 1884. (No model.)

*To all whom it may concern:*

Be it known that I, FRANCIS H. RICHARDS, a citizen of the United States, residing at Springfield, in the county of Hampden and State of Massachusetts, have invented a new and useful Friction-Clutch, of which the following is a specification, reference being had to the accompanying two sheets of drawings.

This invention relates to friction-clutches especially adapted for use in lathe-heads and in other similar situations where it is required to place a powerful clutch mechanism in a limited space, the object being to provide an improved combination of the friction-rings in such clutches and improved means for operating said rings.

Figure 7:
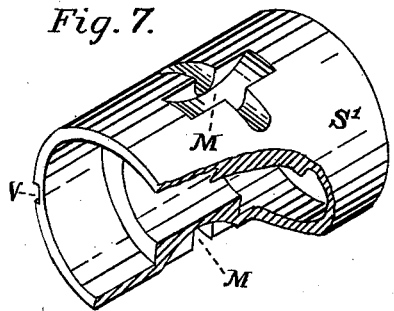
Figure 2:
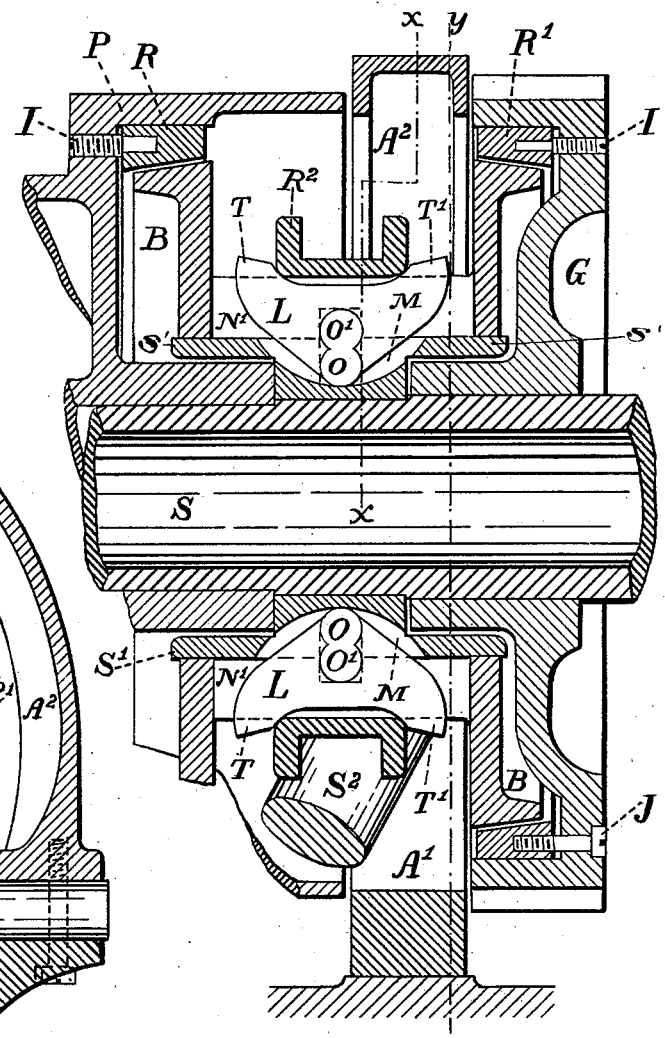
Figure 3:
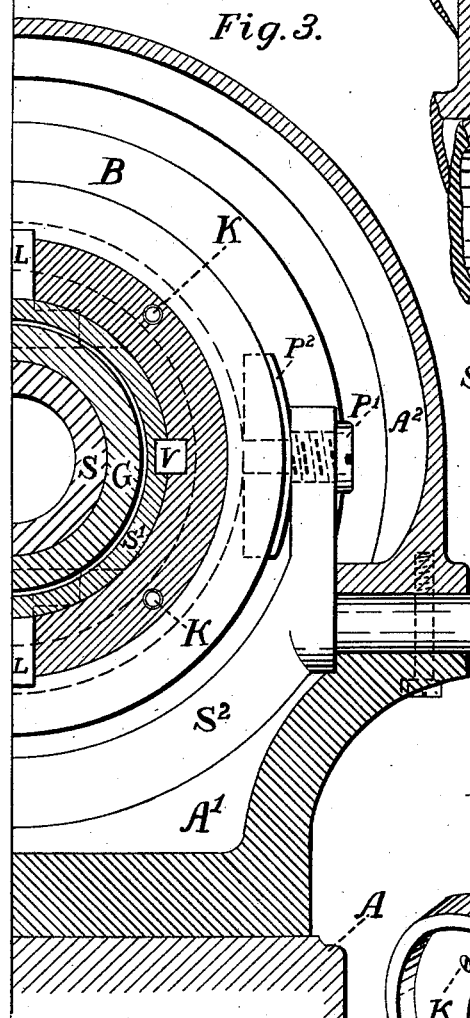
Figure 6:
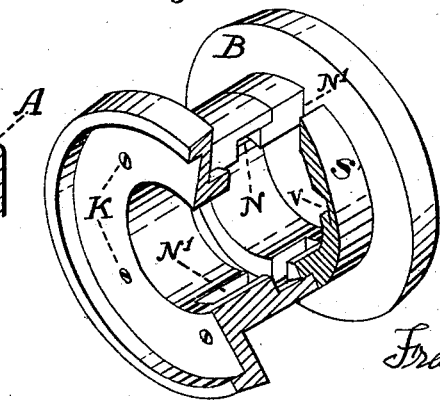

Referring to the drawings, Figure 1 is a plan view of a lathe-head provided with a clutch mechanism embodying my invention. Fig. 2 is an enlarged vertical section of that mechanism. Fig. 3 is a vertical cross-section of the same in line Y Y, Fig. 2. Fig. 4 is a similar view in line X X, Fig. 2. Fig. 5 is a drawing, in three views, of the clutch-levers. Fig. 6 is a perspective view, partially in section, of the sliding friction-drum. Fig. 7 is a perspective view, also partially in section, of a sleeve which is usually fixed to the lathe-spindle, but which may be formed integral therewith.

Similar letters refer to similar parts throughout the several views, and these parts are as follows:

A is any suitable lathe-head frame. It has bearings for the lathe-spindle, and usually for a back-gear shaft of the usual description.

A' and A² are respectively the lower and upper parts of the shipper-shaft frame, which is secured to the lathe-head frame by means of screws. (Not shown.) It is preferably divided into two parts at the shipper-shaft bearing, to facilitate the assembling of the clutch mechanism.

S is a lathe-spindle of the usual description, preferably made hollow, as shown, which is adapted to carry other parts as hereinafter described.

S' is a cylindrical tubular bushing or sleeve, which is rigidly fixed to the lathe-spindle. It has a keyway for key V, Figs. 3 and 7, and two cross-shaped channels, M, Fig. 7, adapted to receive a portion of levers L, as shown best in Figs. 2 and 4. It is possible to make this sleeve integral with the lathe-spindle S; but I prefer the present construction, for the reason, chiefly, that it is more easily made seperate from said spindle.

G is a spur wheel or gear, which is fitted to revolve freely upon the spindle S, and the hub of which is preferably made to extend within one end of sleeve S', in order to have a better bearing upon said spindle. It is also formed to receive a suitable friction-ring, R', and has a series of screws for securing said ring. (See Fig. 2.) In some cases, especially when the clutch mechanism is used upon counter-shafts, a pulley may be substituted for this spur-wheel.

P is a cone-pulley which is fitted to revolve freely upon spindle S, at the opposite end of sleeve S' from spur-wheel G, and the hub of which is, preferably, made to extend within one end of sleeve S', in order to have a better bearing upon said spindle. It carries a pinion, G', is formed to receive a suitable friction-ring, R, and has a series of screws for securing said ring. (See Fig. 2.)

R and R' are two friction-rings, which are adjustably secured, the former into the pulley P and the latter into spur-wheel G, by means of two sets of screws, I and J, alternating with each other, of which the first set, I, acts to force these rings toward and the second set, J, to draw them away from each other, so that by a proper adjustment of these screws the rings may be adjusted and secured in any desired position. Those screws, by passing into both the ring and the wheel, (or pulley,) act to communicate power from one to the other of the same.

B is a sliding friction-drum, which is adapted to slide upon sleeve S', and has enlargements at each end with frictional surfaces corresponding to the interior surface of rings R R'. This drum is made in two parts, for convenience of manufacturing the same, these parts being rigidly secured together by means of a series of screws, K. These parts are so shaped where coming together as to form an internal groove, N, at or near the center of the drum for receiving the bearings O' of levers L, and two or more mortises, N', (if more than two levers, L, are used, as there may be, the number of mortises for them must of course correspond, see Figs. 1, 2, and 6,) are also made in the cylindrical part of this drum to receive the main part of those levers.

L L are two levers, duplicates, for sliding the friction-drum upon sleeve S', which are fitted to work within the mortises N' and groove N of said drum and cross-shaped channels M of said sleeve. This is shown best in Figs. 2 and 4. These levers have formed upon each side of them a fulcrum, O, fitting closely into said channel M, and above that fulcrum bearings O', which work in the groove N of said drum. The levers are operated by means of a sliding ring acting against the ends T T', which are made inclined for that purpose. The relative proportions of these levers, the sleeve S', and the drum B are such that said levers are retained in proper positions between the latter without the aid of any other parts.

$R^2$ is a grooved shipper-ring constructed to slide and turn freely upon drum B, and which is suitably formed to operate levers L. (See Fig. 2.) It is operated from shipper-shaft $S^2$ by means of friction-blocks $P^2$, which are carried upon pivot-screws P', that are screwed into the arms of said shaft, as shown best in Figs. 3 and 4.

$S^2$ is the shipper-shaft, which is adapted to be oscillated in bearings formed partly in each of the parts A' and $A^2$ by means of a hand-lever, $L^2$, and has two upward-projecting arms into which the pivot-screws P' are secured. The central part of this shaft is curved downward to pass under ring $R^2$, so that the said arms may be short, and thereby afford a greater leverage for moving said ring.

G' is a pinion fixed to one end of the pulley P, which gears into a spur-wheel, $G^2$, which is fixed to the hollow shaft $S^4$, (see Fig. 1,) that carries the pinion $G^3$ for driving the spur-wheel G, hereinbefore described. The said hollow shaft is supported by a shaft, $S^3$, which is carried in brackets formed upon frame A. This gearing will be recognized as that usually employed in back-geared lathes and screw-machines, so that no further description of it is here required.

V, Fig. 3, is a spline or key of the usual description, which acts to prevent the drum B from turning without preventing it from sliding upon the sleeve S'. The keyway for this key is also shown in the sleeve at V, Fig. 7, and in the drum at V, Fig. 6.

K, I, and J are screws which have been hereinbefore described in connection with the parts B, G, and P. When the cone-pulley P is revolved, it drives the spur-wheel G, by means of the gearing described, in the same direction with a slower velocity; and if the several parts $S^2$, $R^2$, L, and B are in a position central to their stroke, as shown in Fig. 2, the said pulley and gear will turn freely upon spindle S, which will then stand at rest.

To start the lathe-spindle at a slow speed, we have to force the right-hand end of drum B against the inner surface of friction-ring R', and to start it at a faster speed to force the opposite end of said drum against the similar ring, R. This is done as follows: The hand-lever $L^2$, which projects upward from shaft $S^2$, is thrown toward the right hand, Fig. 1, thereby turning shaft $S^2$, and by means of pivot-screws P' and block $P^2$, sliding the ring $R^2$ upon drum B, also toward the right hand. This ring $R^2$ then presses down the ends T' of levers L, which, owing to their construction, hereinbefore described, turn upon their fulcrums O within channel M, and by means of their bearings O', which are within the groove N of the friction-drum B, move that drum toward the right hand until it engages with the ring R', as before mentioned, whereby the spindle S is started. During this operation, as the ring $R^2$ moves toward the right and slides on the inclined end T', the opposite and similar ends, T, of those levers rise up behind said ring and furnish a means, upon reversing the motion of that ring, of forcibly withdrawing drum B from its engagement with ring R'. By throwing the hand-lever in the opposite direction these operations are all repeated in a similar manner with respect to ring R, as will be obvious from the drawings. Thus, by my invention, I provide a powerful and compact friction-clutch mechanism, composed of but few parts, and these not especially liable to derangement, in which the engagement or disengagement of either pair of friction-surfaces is effected by a positive motion of a hand-lever without the use of springs or of frail and objectionable parts of any kind.

The rings R and R' are provided to afford a ready means for compensating for wear; but I am not limited to their use, as the pulley P and the spur-wheel G can be made to have the required friction-surfaces.

I claim as my invention—

1. In a friction-clutch, in combination, a fixed sleeve, S', having channel M, a sliding drum, B, and levers L, substantially as described.

2. In a friction-clutch, in combination, the fixed sleeve or spindle enlargement S', drum B, sliding upon said sleeve or enlargement, levers L, having two arms, T and T', and ring $R^2$, substantially as described.

3. In a friction-clutch, in combination, a sleeve, S', a sliding drum, B, levers L, ring $R^2$, and shaft $S^2$, substantially as described.

4. In a friction-clutch, in combination, drum B, pulley P, ring R, and screws I, whereby said ring may be adjusted toward said drum, substantially as described.

5. In a friction-clutch, in combination, drum B, pulley P, ring R, screws I, and screws J, whereby said ring may be adjusted within said pulley in both directions relative to said drum, substantially as described.

FRANCIS H. RICHARDS.

Witnesses:
C. O. PALMER,
H. F. L. ORCUTT.